(12) United States Patent
Puryk et al.

(10) Patent No.: US 10,288,148 B2
(45) Date of Patent: May 14, 2019

(54) FEED CONVEYOR BELT AND COUPLER

(71) Applicant: Deere & Company, Moline, IL (US)

(72) Inventors: Corwin M. Puryk, Bettendorf, IA (US); David W. Peters, Bettendorf, IA (US); Volker Fuchs, Bettendorf, IA (US)

(73) Assignee: DEERE & COMPANY, Moline, IL (US)

( * ) Notice: Subject to any disclaimer, the term of this patent is extended or adjusted under 35 U.S.C. 154(b) by 0 days.

(21) Appl. No.: 15/793,934

(22) Filed: Oct. 25, 2017

(65) Prior Publication Data

US 2018/0343801 A1     Dec. 6, 2018

Related U.S. Application Data

(60) Provisional application No. 62/513,409, filed on May 31, 2017.

(51) Int. Cl.
| | | |
|---|---|---|
| *F16G 3/08* | (2006.01) | |
| *A01D 61/02* | (2006.01) | |
| *B65G 15/34* | (2006.01) | |

(52) U.S. Cl.
CPC .............. *F16G 3/08* (2013.01); *A01D 61/02* (2013.01); *B65G 15/34* (2013.01); *B65G 2201/0202* (2013.01); *Y10T 24/166* (2015.01)

(58) Field of Classification Search
CPC ........ B65G 15/30; B65G 15/32; B65G 15/34; B65G 15/36; B65G 2201/0202; F16G 3/00; F16G 3/06; F16G 3/07; F16G 3/08; F16G 3/09; A01D 61/02; Y10T 24/16; Y10T 24/166; Y10T 24/1664; Y10T 24/168

USPC ....................................... 198/844.2; 474/257
See application file for complete search history.

(56) References Cited

U.S. PATENT DOCUMENTS

| | | | | |
|---|---|---|---|---|
| 2,265,604 | A | * | 12/1941 | Knoedler ................. F16G 3/00 24/31 C |
| 3,810,278 | A | * | 5/1974 | Kenney ..................... F16G 3/00 24/31 W |
| 4,617,716 | A | * | 10/1986 | Lay ........................... D01F 9/32 24/31 B |
| 6,460,945 | B2 | * | 10/2002 | Takeno .................. B62D 55/20 305/165 |

(Continued)

FOREIGN PATENT DOCUMENTS

| | | |
|---|---|---|
| EP | 3078880 A1 | 10/2016 |
| FR | 501012 A | 3/1920 |

OTHER PUBLICATIONS

European Patent Office Search Report and Search Opinion for Application No. 18175036.5 dated Sep. 20, 2018 (6 pages).

(Continued)

*Primary Examiner* — Gene O Crawford
*Assistant Examiner* — Keith R Campbell
(74) *Attorney, Agent, or Firm* — Michael Best & Friedrich LLP

(57) ABSTRACT

A belt and coupler arrangement for a feederhouse feed conveyor of an agricultural harvester includes an elongate belt having an elongate web (154) with a first end (102) and a second end (104), wherein the first end (102) and the second end (104) are thicker than the elongate web; and a coupler (100) having a first elongate recess to receive and enclose the first end (102), and a second elongate recess to receive and enclose the second end (104).

14 Claims, 4 Drawing Sheets

(56) References Cited

U.S. PATENT DOCUMENTS

| | | | |
|---|---|---|---|
| 7,810,219 B2* | 10/2010 | Lindemann | F16G 3/08 24/31 R |
| 2008/0060171 A1 | 3/2008 | Lindemann | |
| 2017/0023101 A1* | 1/2017 | Jager | F16G 3/06 |

OTHER PUBLICATIONS

European Patent Office Search Report and Search Opinion for Application No. 18175030.8 dated Oct. 8, 2018 (5 pages).

* cited by examiner

FEED CONVEYOR BELT AND COUPLER

FIELD OF THE INVENTION

This invention relates to agricultural harvesters. More particularly it relates to belted crop feed conveyors for agricultural harvesters. Even more particularly, it relates to coupler for the endless belts of such conveyors.

BACKGROUND OF THE INVENTION

Agricultural harvesters such as combines or windrowers, travel through fields of agricultural crop harvesting the crop. In one common arrangement, agricultural harvesting heads extend forward from the agricultural harvester to engage the plant stalks, sever them, and carry the severed crop into the body of the agricultural harvester itself for further processing.

The agricultural harvesting heads are supported on feeder houses, which are boxlike structures that extend forward from the agricultural harvester. Feeder houses comprise hollow rectangular box-like housings with an open front end and an open rear end. A feet conveyor is fixed inside the housing. The feed conveyor typically comprises a laterally extending front shaft extending through the sidewalls of the housing at the front of the housing where it couples to the agricultural harvesting head and a laterally extending rear shaft that extends through the sidewalls of the housing at the rear of the housing where it couples to the combine. Two endless chain belts extend around these two shafts, typically on toothed sprockets. Elongate slats are fixed to and between these two chain belts and extend laterally, generally parallel to the two shafts.

As the two shafts rotate, they cause the chains or belts to recirculate, which in turn causes the slats to drag across the floor of the feeder house housing. The slats extending downward from the lower run of the endless chains or belts grip the top of the cut crop material and drag it into the feederhouse. The slats drag the cut crop material upward on the floor of the feederhouse and release it into the combine itself.

One problem with this arrangement is excessive noise and wear. Chain belts running on toothed sprockets are noisy. Further, the metal links in the chain wear against each other. For this reason, some manufacturers have replaced the feed conveyor chain belts with fiber reinforced rubber (elastomeric) belts.

Unfortunately, these fiber reinforced rubber belts cannot be reliably spliced at each end. The splices at the end of the belt loosens and the belt itself pulls loose or breaks.

U.S. Pat. No. 6,460,945 B2 shows an endless track.

What is needed is an endless belt and coupler for a feederhouse feed conveyor that can be more easily assembled, can be assembled more tightly and consistently, and is less likely to loosen or break.

It is an object of this invention to provide such a belt and coupler arrangement.

SUMMARY OF THE INVENTION

In accordance with a first aspect of the invention a belt and coupler arrangement for a feederhouse feed conveyor of an agricultural harvester is provided, the arrangement comprising: an elongate belt having an elongate web with a first end and a second end, wherein the first end and the second end are thicker than the elongate web; and a coupler having a first elongate recess to receive and enclose the first end, and a second elongate recess to receive and enclose the second end; wherein the first elongate recess has a first elongate gap defined by first and second lips that are opposed and through which the elongate web extends; wherein the second elongate recess has a second elongate gap defined by third and fourth lips that are opposed and through which the elongate web extends; and wherein the coupler further comprises: a first plate having a first abutment surface and the first and third lips; a second plate having a second abutment surface and the second and fourth lips; and at least one threaded fastener fixing the first plate and the second plate together and forcibly abutting the first and second abutment surfaces together when the at least one fastener is torqued; wherein the first and second abutment surfaces when forced into an abutting relationship establish predetermined volumes of the first and second elongate recesses and predetermined widths of the first and second elongate gaps.

The first end may define a first upper lobe that extends upward above the web and a first lower lobe that extends downward below the web.

The second end may define a second upper lobe that extends upward above the web and a second lower lobe that extends downward below the web.

The first upper lobe and the second upper lobe may be disposed in a first central recess, and the first lower lobe and the second lower lobe may be disposed in a second central recess.

The first and second abutment surfaces may be disposed between the first end and the second end.

The at least one fastener may extend through a first gap in the first and second abutment surfaces.

The web may comprise a first fiber layer extending substantially the entire length of the web, and the first end may comprise a first retaining rod wrapped by the first fiber layer.

The web may comprise a second fiber layer extending substantially the entire length of the web, and the first end may comprise a second retaining rod wrapped by the second fiber layer.

The first retaining rod and the second retaining rod may be disposed inside the first elongate recess.

The first retaining rod and the second retaining rod may have a height greater than the first elongate gap.

The first retaining rod and the second retaining rod may abut opposing sides of the first elongate recess to prevent the first end from being pulled out of the first elongate recess.

A first end wall may cover a first end of the first and second upper lobes, and a first end of the first and second lower lobes.

A second end wall may cover a second end of the first and second upper lobes, and a second end of the first and second lower lobes.

The first end wall and the second end wall may extend from the second plate, and abut the first plate.

The first abutment surface may be disposed on a first ridge extending downward from an underside of the first plate, and the second abutment surface may be disposed on a second ridge that extends upward from an upper side of the second plate.

DETAILED DESCRIPTION OF THE PREFERRED EMBODIMENTS

In the discussion below, the terms "up", "upper", "upward", "down", "downward", "above", "below" and the like are used for convenience and clarity to describe relative locations and positions of coupler components as illustrated in the accompanying figures. The direction "up" as indicated in each of the figures by the arrow marked "U".

Figure 1:
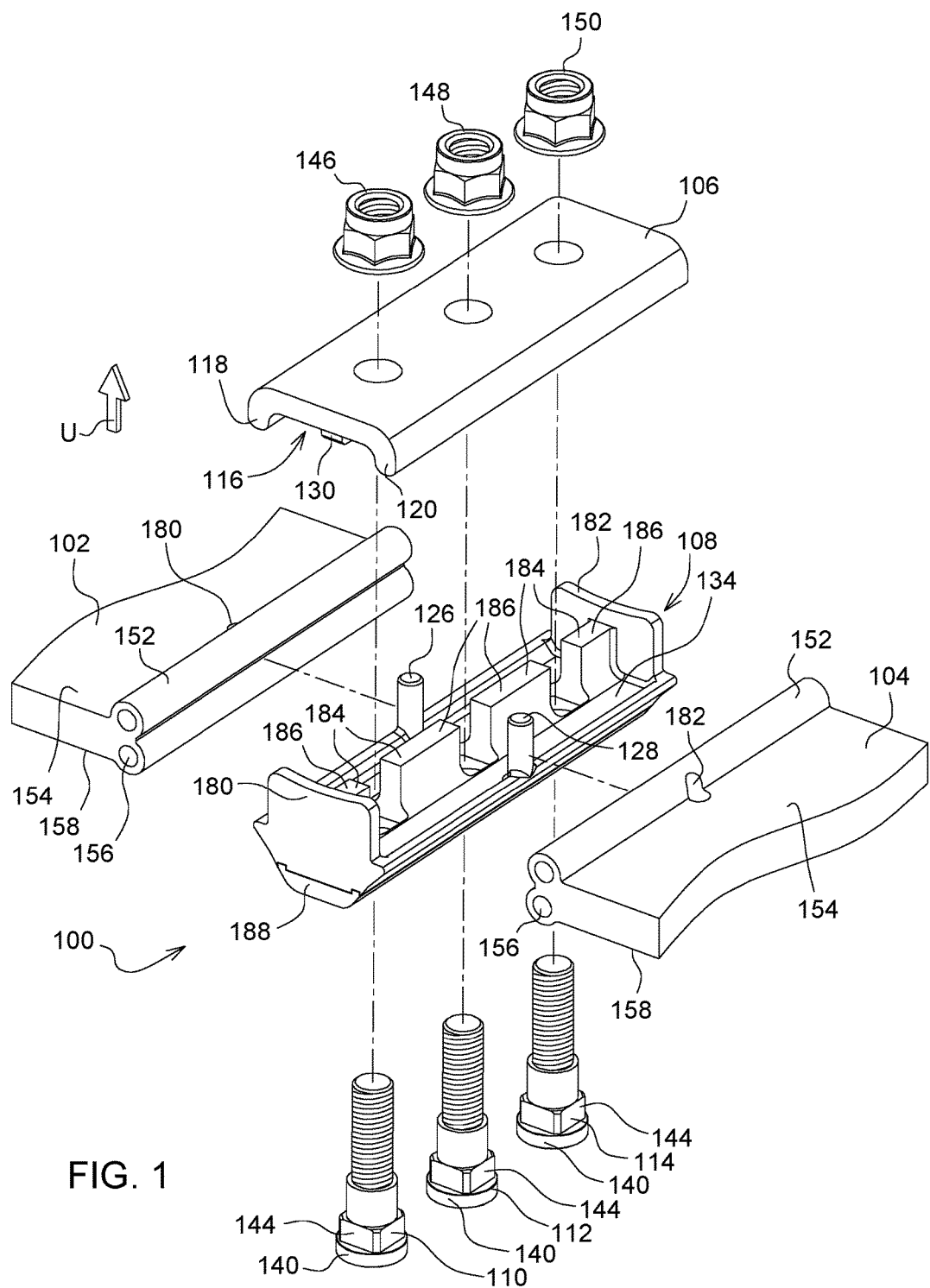
FIG. 1 is a perspective exploded view of the coupler and belt ends that it joins.
Figure 2:
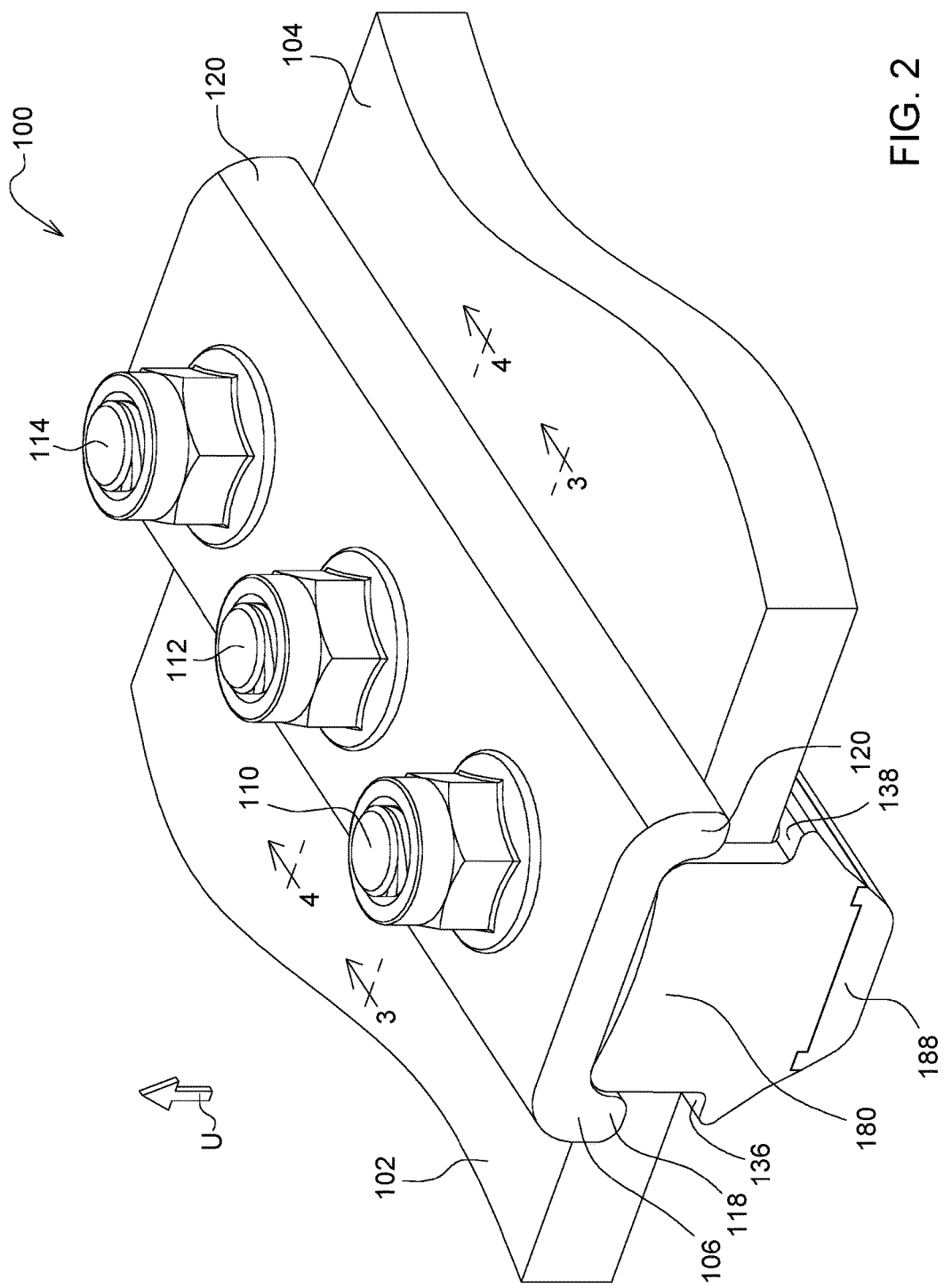
FIG. 2 is a perspective assembled view of the coupler and belt ends of FIG. 1.

In FIGS. 1-2, a coupler 100 connects two belt ends 102, 104 together. The coupler 100 comprises an upper plate 106 and a lower plate 108 that are fixed together by three removable fasteners 110, 112, 114.

The upper plate 106 has a central recess 116 defined by the recessed underside of the upper plate 106 and by two lips 118, 120 that extend downward from the upper plate 106 and extend substantially the entire length of the upper plate.

The upper plate 106 has three through holes disposed along the longitudinal centerline of the upper plate 106 to receive the three fasteners 110, 112, 114. The fasteners 110, 112, 114 are oriented perpendicular to the longitudinal extent of the upper plate 106. The underside of the upper plate 106 has two recesses 122, 124 extending upward into the upper plate 106 that are configured to receive and cover guide pins 126, 128. The guide pins 126, 128 are fixed to and extend upward from the upper surface of the lower plate 108.

A ridge 130 is formed on the underside of the upper plate 106 and extends downward therefrom. The ridge 130 extends substantially the entire length of the upper plate 106. The ridge 130 has a lower surface 132 that abuts the upper surface of a corresponding ridge that extends upward from the lower plate 108 when the coupler 100 is assembled.

The lower plate 108 has a central recess 134 that extends substantially the entire length of the lower plate 108. It is defined by the floor of the lower plate 108 and by two lips 136, 138 that extend upward from the floor of the lower plate 108 and extend substantially the entire length of the lower plate.

A ridge 184 is formed on the upper side of the lower plate 108 and extends upward therefrom. The ridge 184 extend substantially the entire length of the lower plate 108. The ridge 184 has an upper surface 186 that abuts the lower surface 132 of the ridge 130 of the upper plate 106 when the upper plate 106 in the lower plate 108 are bolted together by the fasteners.

Two end walls 180, 182 extend upward from the proximal and distal ends of the lower plate 108. The end walls 180, 182 enclose and cover the opposite sides of the belt end 102 and the belt end 104. The end walls 180, 182 enclose and cover the upper lobes 152 and the lower lobes 156. The end walls 180, 182 enclose and cover the retaining rods 164, 166, 168, 170. The two end walls 180, 182 prevent the belt ends, the lobes, and the rods from migrating side-to-side and possibly slipping sideways out of the coupler 100. Further, they prevent debris and other contaminants from filling gaps between the belt ends and the coupler.

When the coupler 100 is assembled and the upper plate 106 and the lower plate 108 are bolted together with the fasteners, the upper ends of the two end walls 180, 182 abut each other.

The lower plate 108 has three through holes disposed along the longitudinal centerline of the lower plate 108. Each of these three holes receives a corresponding one of the three fasteners 110, 112, 114. The three fasteners 110, 112, 114 are threaded fasteners. Each threaded fastener has a head 140 that engages a recessed, countersunk shoulder 142 that is formed in each of the holes extending through the lower plate 108. The shoulder permits the head 140 to be positioned completely into the bottom surface of the lower plate 108 when the coupler 100 is assembled. This recessed position prevents each head 140 from being worn away as the endless belt and coupler 110 are recirculated about the teeth or cogs on the drive sprocket or drive gear about which the endless belt and coupler 100 recirculate.

The shank 144 of the threaded fasteners 110, 112, 114 above the head 140 are four-sided, and the portion of the hole in the lower cover 108 which receives the four-sided shank has four similar surfaces that engage the shank of the fasteners and prevented the fastener from being rotated within the whole when the three nuts 146, 148, 150 are tightened on the three threaded fasteners 110, 112, 114, respectively.

The ends 102, 104 of the belt that are coupled together by the coupler 100 to make an endless belt are specially configured to mate with the coupler 100. In particular, each belt end 102, 104 has an upper lobe 152 at the end of the belt that extends above the upper surface of the web 154. Further, each belt end as a lower lobe 156 that extends below the lower surface of the web 154. Thus, the ends 102, 104 of the belt have a structure that protrudes above the surface of the belt and the structure that protrudes below the surface of the belt.

Further, the belt has a continuous web that is reinforced by high strength fibers. These high strength fibers are embedded within an elastomeric matrix. These fibers may be in the form of a woven fabric layer, or they may be merely an array of longitudinal fibers. These fibers can be glass fibers, carbon fibers, Kevlar, or other suitable high-strength yet flexible material. There are at least two fiber layers 160, 162 overlaying each other that extend the length of the belt.

Fiber layer 162 is wrapped around a retaining rod 164, and returns backward to overlap fiber layer 162. The retaining rod 164 extends the entire width of the belt. It is the retaining rod 164 that provides the bulk of the thickness of the upper lobe 152 (on belt end 102) and causes it to extend upward above the upper surface 154 of the belt end 102.

In a similar fashion, fiber layer 160 is wrapped around a retaining rod 166 and returns backward to overlap fiber layer 160. The retaining rod 166 extends the entire width of the belt. It is the retaining rod 166 that provides the bulk of the thickness of the lower lobe 156 (on belt end 102) and causes it to extend downward below the lower surface 158 of the belt end 102.

Likewise for the belt end 104, fiber layer 162 is wrapped around a similar retaining rod 168 and returns backward to overlap fiber layer 162 the retaining rod 168 extends the entire width of the belt. It is the retaining rod 168 that provides the bulk of the thickness of the upper lobe 152 (on belt end 104) and causes it to extend upward above the upper surface 154 of the belt end 104.

In a similar fashion, fiber layer 160 is wrapped around a retaining rod 170 and returns backward to overlap fiber layer 160. The retaining rod 170 extends the entire width of the belt. It is the retaining rod 170 that provides the bulk of the thickness of the lower lobe 156 (on belt end 102) and causes it to extend downward below the lower surface 158 of the belt end 104.

The fiber layers 160, 162 and the retaining rods 164, 166, 168, 170 are preferably cured together with the elastomeric material such that the retaining rods and the fiber layers, are fused together in a common elastomeric matrix.

Figure 3:
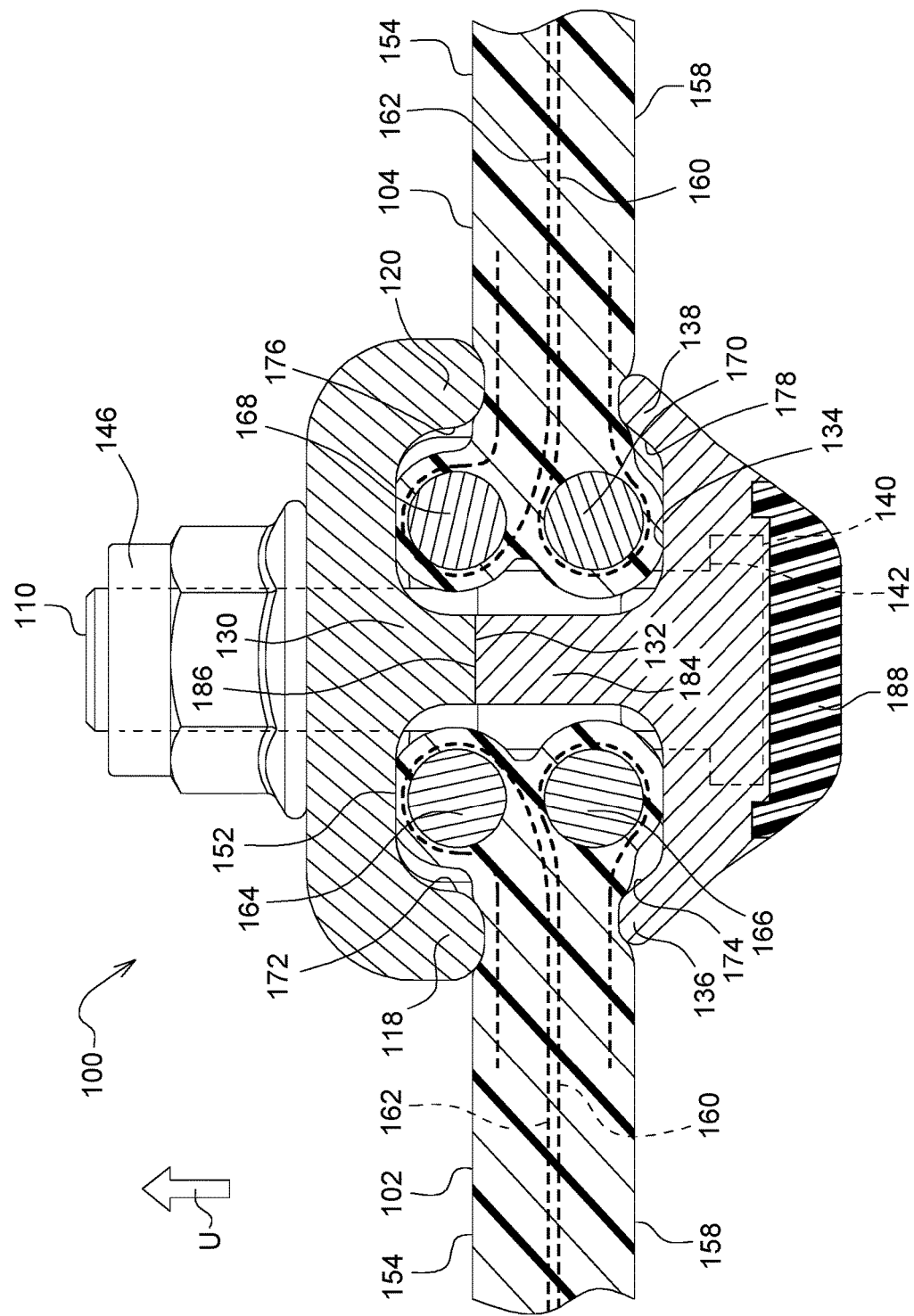
FIG. 3 is a cross-section through the assembled coupler and belt ends of FIG. 2 taken at section line 3-3 in FIG. 2.
Figure 4:
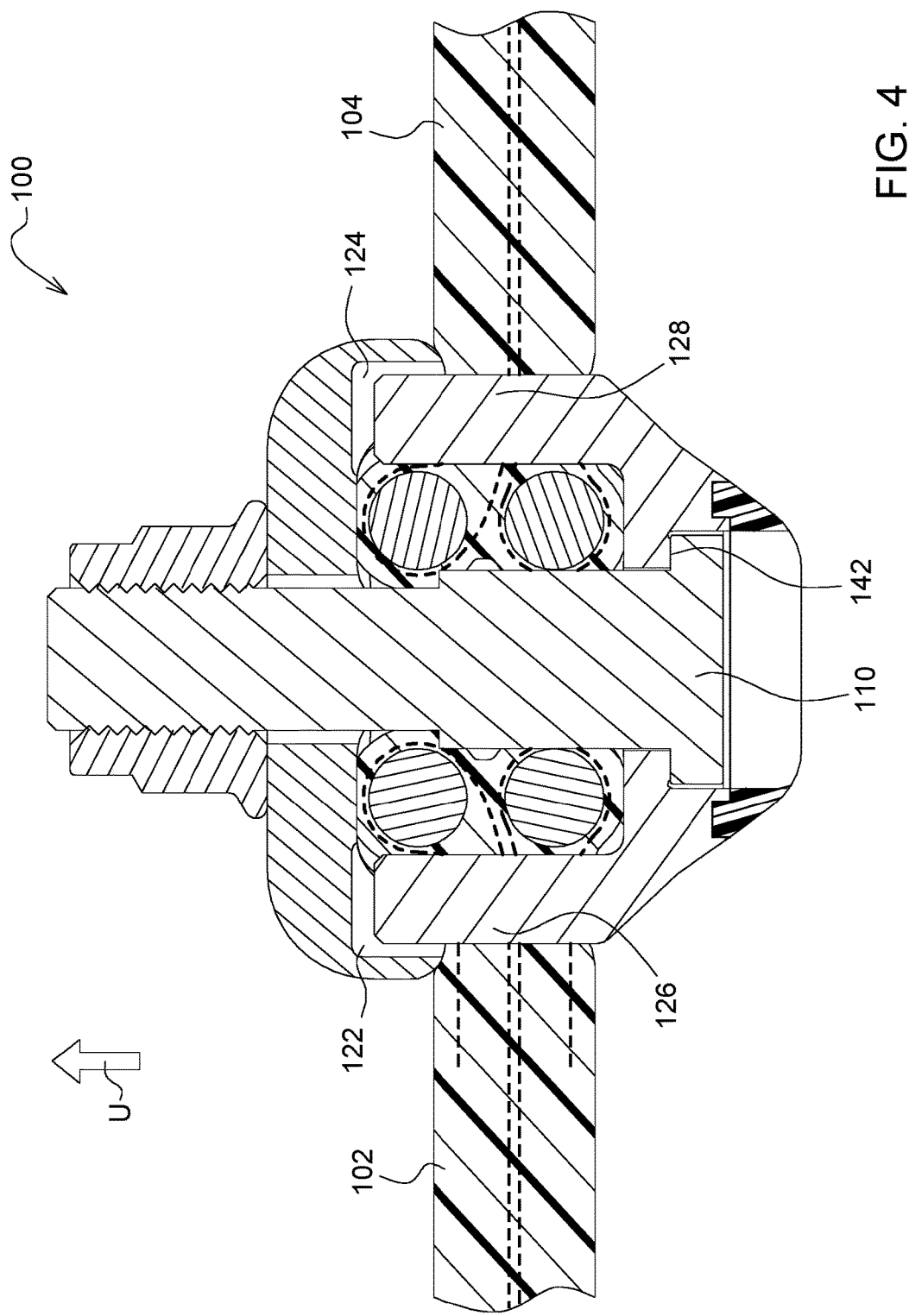
FIG. 4 is a cross-section through the assembled coupler and belt ends of FIGS. 2-3 taken at section line 4-4 in FIG. 2

FIGS. 2, 3, and 4 show the coupler 100 in its assembled form, joining the belt ends 102, 104 together to form and endless conveyor belt. Nuts 146, 148, 150 are tightened on the fasteners 110, 112, 114. To provide for easy assembly, the guide pins 126, 128 are provided as anchors for the belt ends 102, 104. The operator places the belt end 102 on the guide pin 126 of the lower plate 108. The guide pin 126 passes through hole 180. The operator then places the belt end 104 on the other guide pin 128. The guide pin 128 passes through hole 182 in the belt end 104. These two guide pins extend upward and parallel to each other. The belt ends 102, 104 are typically pulling away from each other, and the guide pins 126 and 128 serve to hold the belt ends together for completing the assembly process.

Once the belt ends 102, 104 are placed on guide pins 126, 128, the operator can free one of his hands to place the upper plate 106 on top of the lower plate 108. The operator, pinching the upper plate and the lower plate together, can then reach underneath the lower plate 108 and insert one of the fasteners 110, 112, 114 upward through a through hole in the lower plate 108 and through the corresponding through hole in the upper plate 106.

The operator can then tighten one of the nuts on the fastener by hand. At this point, the upper plate 106 in the lower plate 108 cannot separate from each other, and the belt ends (hooked on their respective guide pins) cannot come loose. At this point, the operator can use both his hands to insert the remaining fasteners into the coupler and attach the remaining nuts.

The provision of the guide pins as a temporary retainer of the belt ends 102, 104 during the assembly process frees the operator to perform the additional manual assembly steps.

The operator tightens the nuts 146, 148, 150 drawing the upper plate 106 and the lower plate 108 together. The operator tightens these nuts until the upper surface 186 of the ridge 184 abuts the lower surface 132 of the ridge 130, and the upper surface of the end walls 180, 182, abut the downwardly facing surface of the central recess 116.

Once the surfaces abut each other, the upper plate 106 and the lower plate 108 are fixed in their relative positions. Any further tightening of the nuts does not move the upper plate 106 and lower plate 108 closer together.

After abutment of the two plates, the fasteners and nuts can subsequently be tightened to a higher torque that ensures the fasteners will not slacken or loosen during normal operation. The increase in pressure between the upper plate 106 and the lower plate 108 due to this additional tightening is communicated through the ridges and the end walls of the two plates.

As best shown in FIG. 3, when the two plates 106, 108 abut each other, the two lobes 152, 156 on each of the belt ends 102, 104 are trapped within a pocket defined between the central recesses 116, 134 and the lips 118, 136 (for the belt end 102) and 120, 138 (for the belt end 104).

A longitudinal gap is provided between lip 118 and 136 of belt end 102. This gap extends substantially the entire width of the coupler 100. The web of the belt extends between these lips, and is slightly compressed by them. Lobes 152 and 156 at the end of belt end 102 are thicker than the gap between the lips 118 and 136 (largely due to the thickness of the retaining rods 164, 166). When tension is applied to the belt end 102, the belt end 102 is drawn out of the coupler 100 until lobes 152 and 156 abut the inner surfaces 172, 174 of the lips 118, 136, respectively. Due to the size of the retaining rods 164, 166, the belt end 102 cannot be removed from the coupler 100.

Similarly, a longitudinal gap is provided between lip 120 and 138 of belt end 104. This gap extends substantially the entire width of the coupler 100. The web of the belt extends between these lips and is slightly compressed by them. Lobes 152 and 156 at the end of belt end 104 are thicker than the gap between the lips 120 and 138 (largely due to the thickness of the retaining rods 168, 170). When tension is applied to the belt end 104 the belt end 104 is drawn out of the coupler until lobes 152 and 156 abut the inner surfaces 176, 178 of the lips 120, 138, respectively. Due to the size of the retaining rods 168, 170, which are thicker than the web 154 itself, the belt end 104 cannot be pulled out of the coupler 100 and retain the belt ends within the coupler. The belt ends are not retained within the coupler 100 by the pressure of the lips upon the web 154 (which is minimal, but by the inability of the lobes to be pulled into and through the lips.

When the fasteners are tightened, the abutting surfaces of the two ridges are compressed together and space the lips a predetermined distance apart, providing a constant and repeatable gap between the lips, while permitting considerable torque to be applied to the fasteners thereby preventing them from loosening.

If there were no abutting surfaces, the fasteners could only be tightened sufficiently to compress the web 154 between the lips. This would not prevent the fasteners from loosening over time, letting the gaps between the lips grow, and eventually falling off or letting the belt ends 102, 104 pull loose from the now-widened gaps.

An elastomeric pad 188 is bonded to the lower surface of the second plate 108 to provide a noise-reducing cushion for the coupler 100 when it wraps around a gear or sprocket during operation of the feed conveyor.

The claims below define the invention. The description and figures above are provided to enable one skilled in the art to make and use the invention. Other ways of making and using the invention will be apparent to those skilled in the art.

The invention claimed is:

1. A belt and coupler arrangement for a feederhouse feed conveyor of an agricultural harvester, the arrangement comprising:
   an elongate belt having an elongate web with a first end and a second end, wherein the first end and the second end are thicker than the elongate web; and
   a coupler having a first elongate recess to receive and enclose the first end, and a second elongate recess to receive and enclose the second end;
   wherein the first elongate recess has a first elongate gap defined by first and second lips that are opposed and through which the elongate web extends;
   wherein the second elongate recess has a second elongate gap defined by third and fourth lips that are opposed and through which the elongate web extends; and
   wherein the coupler further comprises:
      a first plate having a first abutment surface and the first and third lips,
      a second plate having a second abutment surface and the second and fourth lips,
      at least one threaded fastener fixing the first plate and the second plate together and forcibly abutting the first and second abutment surfaces together when the at least one fastener is torqued, wherein the first and second abutment surfaces when forced into an abutting relationship establish predetermined volumes of the first and second elongate recesses and predetermined widths of the first and second elongate gaps, and wherein the first abutment surface is disposed on a first ridge extending downward from an underside of the first plate, and wherein the second abutment surface is disposed on a second ridge that extends upward from an upper side of the second plate.

2. The belt and coupler arrangement of claim 1, wherein the first end defines a first upper lobe that extends upward above the web and a first lower lobe that extends downward below the web.

3. The belt and coupler arrangement of claim 2, wherein the second end defines a second upper lobe that extends upward above the web and a second lower lobe that extends downward below the web.

4. The belt and coupler arrangement of claim 3, wherein the first upper lobe and the second upper lobe are disposed in a first central recess, and wherein the first lower lobe and the second lower lobe are disposed in a second central recess.

5. The belt and coupler arrangement of claim 1, wherein the first and second abutment surfaces are disposed between the first end and the second end.

6. The belt and coupler arrangement of claim 1, wherein the at least one fastener extends through a first gap in the first and second abutment surfaces.

7. The belt and coupler arrangement of claim 1, wherein the web comprises a first fiber layer extending substantially the entire length of the web, and wherein the first end comprises a first retaining rod wrapped by the first fiber layer.

8. The belt and coupler arrangement of claim 7, wherein the web comprises a second fiber layer extending substantially the entire length of the web, and wherein the first end comprises a second retaining rod wrapped by the second fiber layer.

9. The belt and coupler arrangement of claim 8, wherein the first retaining rod and the second retaining rod are disposed inside the first elongate recess.

10. The belt and coupler arrangement of claim 9, wherein the first retaining rod and the second retaining rod have a height greater than the first elongate gap.

11. The belt and coupler arrangement of claim 10, wherein the first retaining rod and the second retaining rod abut opposing side of the first elongate recess to prevent the first end from being pulled out of the first elongate recess.

12. The belt and coupler arrangement of claim 2, wherein the first end wall covers a first end of the first and second upper lobes, and a first end of the first and second lower lobes.

13. The belt and coupler arrangement of claim 12, wherein a second end wall covers a second end of the first and second upper lobes, and a second end of the first and second lower lobes.

14. The belt and coupler arrangement of claim 13, wherein the first end wall and the second end wall extend from the second plate, and abut the first plate.

* * * * *